(12) United States Patent
Petersson et al.

(10) Patent No.: US 10,320,450 B2
(45) Date of Patent: Jun. 11, 2019

(54) ANTENNA ARRANGEMENT FOR TWO POLARIZATIONS

(71) Applicant: TELEFONAKTIEBOLAGET LM ERICSSON (PUBL), Stockholm (SE)

(72) Inventors: Sven Petersson, Sävedalen (SE); Fredrik Athley, Kullavik (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/561,091

(22) PCT Filed: Sep. 6, 2017

(86) PCT No.: PCT/EP2017/072295
§ 371 (c)(1),
(2) Date: Sep. 25, 2017

(65) Prior Publication Data
US 2019/0074871 A1 Mar. 7, 2019

(51) Int. Cl.
| H04B 7/04 | (2017.01) |
| H04B 7/0408 | (2017.01) |
| H04B 7/08 | (2006.01) |
| H04B 1/40 | (2015.01) |
| H04B 7/06 | (2006.01) |

(52) U.S. Cl.
CPC .............. *H04B 7/0408* (2013.01); *H04B 1/40* (2013.01); *H04B 7/0617* (2013.01); *H04B 7/0885* (2013.01)

(58) Field of Classification Search
CPC .. H04B 7/0408; H04B 7/0617; H04B 7/0885; H04B 1/40
See application file for complete search history.

(56) References Cited

U.S. PATENT DOCUMENTS

| 9,137,067 B1 * | 9/2015 | Xie ..................... H04L 27/20 |
| 9,800,396 B1 * | 10/2017 | Kuo ..................... H04L 5/1423 |
| 2003/0162566 A1 * | 8/2003 | Shapira ................ H01Q 1/246 |
| | | 455/561 |

(Continued)

FOREIGN PATENT DOCUMENTS

WO    2018130281 A1    7/2018

OTHER PUBLICATIONS

Search Report and Written Opinion for PCT/EP2017/072295 dated Jun. 5, 2018, 16 pages.

*Primary Examiner* — Jean B Corrielus
(74) *Attorney, Agent, or Firm* — Rothwell, Figg, Ernst & Manbeck, P.C.

(57) ABSTRACT

There is provided an antenna arrangement for a radio transceiver device for simultaneous use of two polarization directions. The antenna arrangement comprises at least two baseband chains. The antenna arrangement further comprises a first set of antenna elements of a first polarization direction, and a second set of antenna elements of a second polarization direction. The antenna arrangement comprises an analog distribution network operatively connecting the at least two baseband chains to both sets of antenna elements. All of the baseband chains are operatively connected to each respective antenna element of the first set and to each respective antenna element of the second set via the analog distribution network.

22 Claims, 3 Drawing Sheets

(56) References Cited

U.S. PATENT DOCUMENTS

| | | | |
|---|---|---|---|
| 2008/0318632 A1* | 12/2008 | Rofougaran | H04B 7/0695 |
| | | | 455/562.1 |
| 2010/0177012 A1* | 7/2010 | Morrow | H01Q 21/0025 |
| | | | 343/893 |
| 2012/0244899 A1 | 9/2012 | Barker et al. | |
| 2013/0003789 A1* | 1/2013 | Eom | H04B 7/0469 |
| | | | 375/219 |
| 2013/0314280 A1* | 11/2013 | Maltsev | H01Q 3/34 |
| | | | 342/368 |
| 2014/0036777 A1* | 2/2014 | Kokkinos | H01Q 1/246 |
| | | | 370/328 |
| 2015/0140940 A1* | 5/2015 | Bahng | H04B 7/10 |
| | | | 455/101 |
| 2015/0230102 A1* | 8/2015 | Kang | H04W 16/28 |
| | | | 455/450 |
| 2016/0021597 A1* | 1/2016 | Hart | H04W 40/06 |
| | | | 370/329 |
| 2016/0365900 A1 | 12/2016 | Kim et al. | |
| 2017/0062948 A1* | 3/2017 | Artemenko | H01Q 3/245 |
| 2017/0230091 A1* | 8/2017 | Song | H04B 7/0469 |
| 2017/0264014 A1* | 9/2017 | Le-Ngoc | H01Q 3/2605 |
| 2018/0198513 A1* | 7/2018 | Petersson | H04B 7/10 |

* cited by examiner

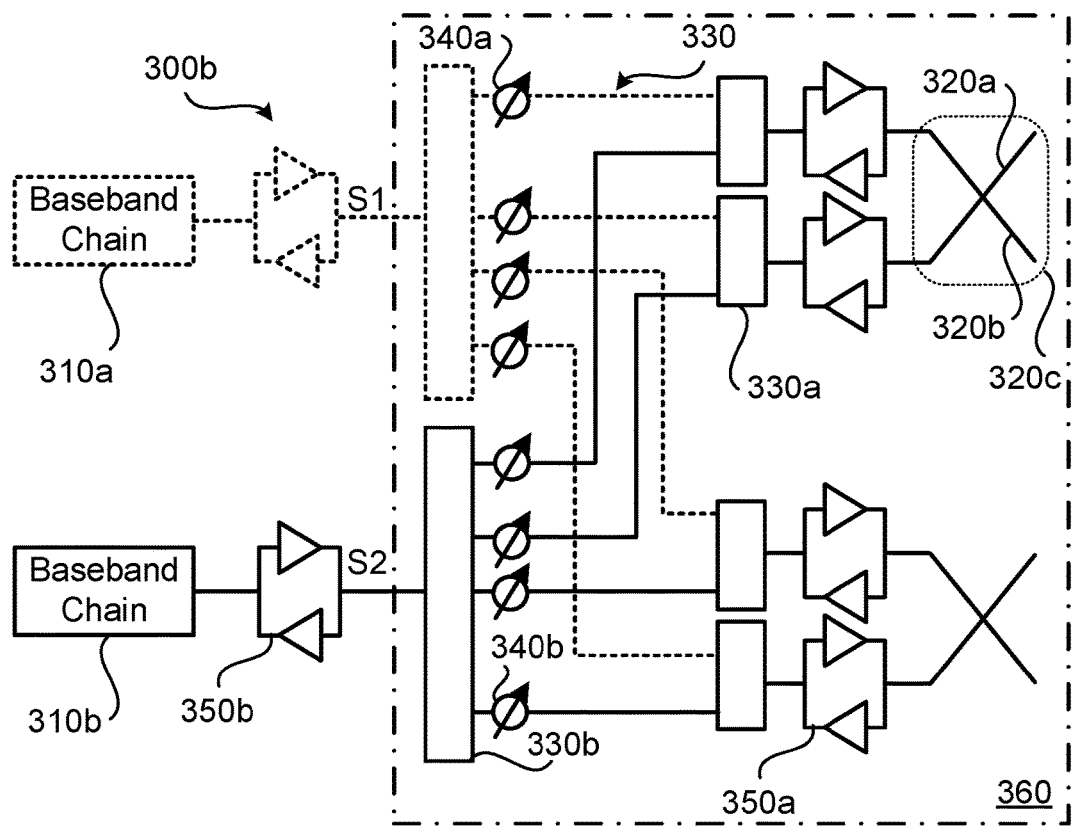
Fig. 3
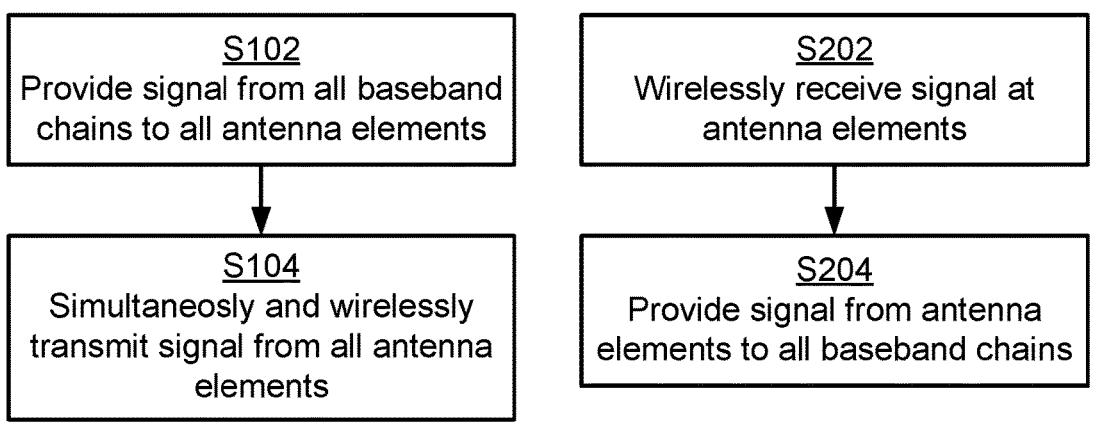
Fig. 4
Fig. 5

ANTENNA ARRANGEMENT FOR TWO POLARIZATIONS

CROSS REFERENCE TO RELATED APPLICATION(S)

This application is a 35 U.S.C. § 371 National Stage of International Patent Application No. PCT/EP2017/072295, filed Sep. 6, 2017, designating the United States, the disclosure of which is incorporated by reference.

TECHNICAL FIELD

Embodiments presented herein relate to a method, an antenna arrangement for simultaneous use of two polarization directions, radio transceiver devices comprising such an antenna arrangement, methods performed by such a radio transceiver devices, computer programs, and a computer program product for performing such methods.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for terminal devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the terminal devices at the user side might be required to reach a sufficient link budget.

The terminal devices and/or the transmission and reception point (TRP) of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different terminal devices, different implementations will be needed.

For terminal devices the incoming signals might arrive from all different directions. Hence it is beneficial to have an antenna implementation at the terminal devices which has the possibility to generate omni-directional-like coverage in addition to the high gain narrow beams.

However, for antenna arrays with single polarized antenna elements (and implementing analog beamforming) it could be challenging to generate beams with a large variety in beamwidths. Hence, antenna arrays with dual-polarized elements are preferred such that dual-polarized beamforming as disclosed in WO2011/050866 A1 and WO2016141961 A1 can be used to generate beams with basically any beamwidths, ranging from the beamwidth of a single antenna element to the beamwidth of the entire antenna array.

One issue with using dual-polarized beamforming, where both polarization ports are used to create a port, for an antenna array implementing analog beamforming is that the resulting beam will only have one distinct polarization in each direction, which means that polarization mismatch can occur between the transmitter and receiver, which can deteriorate the link significantly.

FIG. 1 schematically illustrates an antenna arrangement 100 having two baseband chains 110a, 110b. Each baseband chain 110a, 110b is operatively connected to antenna elements 130a, 130b of an antenna array 120, where one of the baseband chains is operatively connected to all antenna elements of a first polarization, and the other of the baseband chains is operatively connected to all antenna elements of a second polarization.

Even though the antenna arrangement 100 has one baseband chain per polarization, only one signal for one polarization can be transmitted/received in each direction at a given time. It is envisioned that the number of baseband chains might possibly be reduced whilst at the same time applying dual-polarized beamforming for an antenna array implementing analog beamforming, where a single baseband chain is connected to all antenna elements of both polarizations of the antenna array. In this way dual-polarized beamforming can be applied whilst only using a single baseband chain. Such an antenna arrangement might be cheaper to manufacture compared to the antenna arrangement illustrated in FIG. 1. But if two orthogonal polarizations are desired simultaneously with the envisioned antenna arrangement, two such antenna arrangements have to be stacked next to each other, which adds implementation space.

SUMMARY

An object of embodiments herein is to provide efficient antenna arrangements that mitigate the deficiencies noted above and thus enable high flexibility with respect to polarization.

According to a first aspect there is presented an antenna arrangement for a radio transceiver device for simultaneous use of two polarization directions. The antenna arrangement comprises at least two baseband chains. The antenna arrangement further comprises a first set of antenna elements of a first polarization direction, and a second set of antenna elements of a second polarization direction. The antenna arrangement comprises an analog distribution network operatively connecting the at least two baseband chains to both sets of antenna elements. All of the baseband chains are operatively connected to each respective antenna element of the first set and to each respective antenna element of the second set via the analog distribution network.

According to a second aspect there is presented a method for operating an antenna arrangement according to the first aspect for transmission of a signal. The method is performed by a radio transceiver device. The method comprises providing the signal from the at least two baseband chains to the first set of antenna elements and to the second set of antenna elements via the analog distribution network. The method comprises simultaneously and wirelessly transmitting the signal from all the antenna elements.

According to a third aspect there is presented a radio transceiver device for operating an antenna arrangement according to the first aspect for transmission of a signal. The radio transceiver device comprises processing circuitry. The processing circuitry is configured to cause the radio transceiver device to provide the signal from the at least two baseband chains to the first set of antenna elements and to the second set of antenna elements via the analog distribution network. The processing circuitry is configured to cause the radio transceiver device to simultaneously and wirelessly transmit the signal from all the antenna elements.

According to a fourth aspect there is presented a radio transceiver device for operating an antenna arrangement according to the first aspect for transmission of a signal. The radio transceiver device comprises a provide module configured to provide the signal from the at least two baseband chains to the first set of antenna elements and to the second set of antenna elements via the analog distribution network. The radio transceiver device comprises a transmit module configured to simultaneously and wirelessly transmit the signal from all the antenna elements.

According to a fifth aspect there is presented a computer program for operating an antenna arrangement according to the first aspect for transmission of a signal. The computer program comprises computer program code which, when run on processing circuitry of a radio transceiver device, causes the radio transceiver device to perform a method according to the second aspect.

According to a sixth aspect there is presented a method for operating an antenna arrangement according to the first aspect for reception of a signal. The method is performed by a radio transceiver device. The method comprises wirelessly receiving the signal at the antenna elements. The method comprises providing the signal from all the antenna elements which received the signal to all of the at least two baseband chains via the analog distribution network.

According to a seventh aspect there is presented a radio transceiver device for operating an antenna arrangement according to the first aspect for reception of a signal. The radio transceiver device comprises processing circuitry. The processing circuitry is configured to cause the radio transceiver device to wirelessly receive the signal at the antenna elements. The processing circuitry is configured to cause the radio transceiver device to provide the signal from all the antenna elements which received the signal to all of the at least two baseband chains via the analog distribution network.

According to an eighth aspect there is presented a radio transceiver device for operating an antenna arrangement according to the first aspect for reception of a signal. The radio transceiver device comprises a receive module configured to wirelessly receive the signal at the antenna elements. The radio transceiver device comprises a provide module configured to provide the signal from all the antenna elements which received the signal to all of the at least two baseband chains via the analog distribution network.

According to a ninth aspect there is presented a computer program for operating an antenna arrangement according to the first aspect for reception of a signal, the computer program comprising computer program code which, when run on processing circuitry of a radio transceiver device, causes the radio transceiver device to perform a method according to the sixth aspect.

According to a tenth aspect there is presented a computer program product comprising a computer program according to at least one of the fifth aspect and the ninth aspect and a computer readable storage medium on which the computer program is stored. The computer readable storage medium could be a non-transitory computer readable storage medium.

Advantageously this antenna arrangement, these methods, these radio transceiver devices, and these computer programs provide efficient high flexibility with respect to polarization.

Advantageously this antenna arrangement, these methods, these radio transceiver devices, and these computer programs enable dual-polarized beamforming with analog beamforming for two simultaneous orthogonal polarizations to be attained using one single antenna arrangement, which saves implementation space.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2 and 3 schematically illustrate antenna arrangements according to embodiments;

FIGS. 4 and 5 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
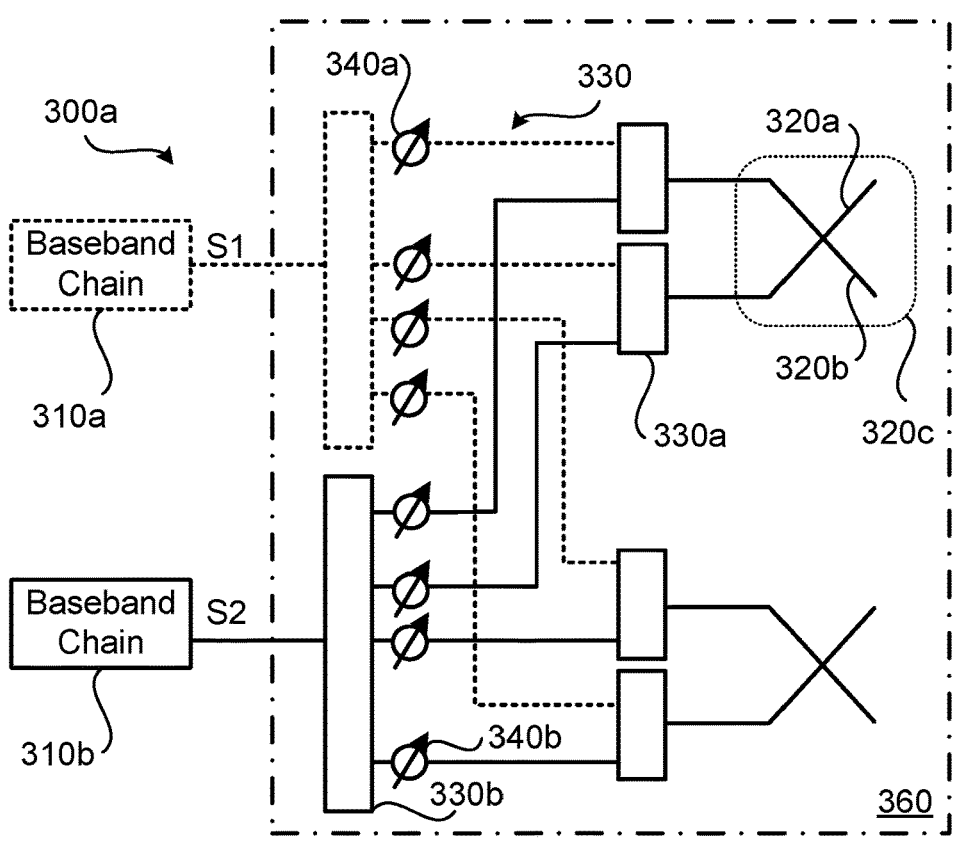

FIG. 2 illustrates an embodiment of an antenna arrangement 300a for a radio transceiver device 200a for simultaneous use of two polarization directions according to an embodiment.

Figure 1:
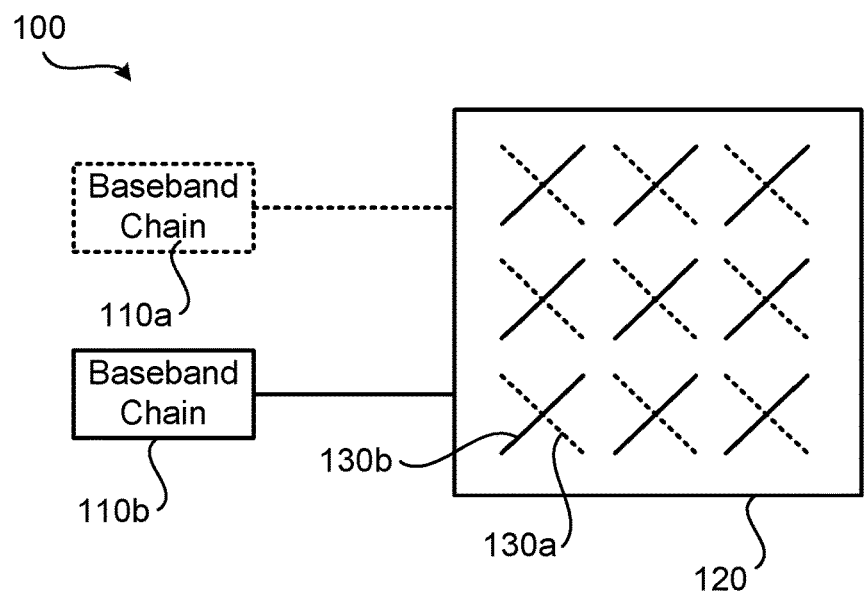
FIG. 1 schematically illustrates an antenna arrangement according to state of the art.

The antenna arrangement 300a comprises at least two baseband chains 310a, 310b. In the illustrative example of FIG. 1 the antenna arrangement 300a comprises precisely two baseband chains 310a, 310b. The antenna arrangement 300a comprises a first set of antenna elements 320a of a first polarization direction, and a second set of antenna elements 320b of a second polarization direction. The antenna arrangement 300a comprises an analog distribution network 330. The analog distribution network 330 is operatively connecting the at least two baseband chains 310a, 310b to both sets of antenna elements 320a, 320b. All of the baseband chains 310a, 310b are operatively connected to each respective antenna element 320a of the first set and to each respective antenna element 320b of the second set via the analog distribution network 330.

This antenna arrangement 300a enables the possibility to change the amplitude and phase settings for both polarizations for each antenna element 320a, 320b for both baseband signals S1, S2 simultaneously and/or independently.

The analog distribution network 330 and the antenna elements 320a, 320b might be part of an antenna array 360.

Further aspects and embodiments relating to the antenna arrangement 300a, 300b will now be disclosed with parallel reference to the antenna arrangements 300a, 300b of FIGS. 2 and 3.

The signal of each baseband chain 310a, 310b will be provided to all antenna elements 320a, 320b (of both polarizations), which enables so-called dual-polarized beamforming. In more detail, a respective one antenna element 320a of the first set might be paired with a respective one antenna element 320b of the second set. Each such pair of antenna elements forms a dual-polarized antenna element 320c. Particularly, according to an embodiment each respective antenna element 320a of the first set together with each respective antenna element 320b of the second set form a respective dual-polarized antenna element 320c. By using dual-polarized beamforming, almost arbitrarily beam widths could be attained, which will improve the transmission and reception performance of the radio transceiver device 200. Details of dual-polarized beamforming are provided in in documents WO2011/050866 A1 and WO2016141961 A1 and will be further disclosed below.

In some embodiments the antenna arrangement 300a, 300b further comprises splitters/combiners 330a, 330b. The splitters/combiners 330a, 330b are configured to selectively either split one incoming signal to at least two output signals (thus implementing the functionality of a splitter) or combine at least two incoming signals to a single output signal, depending on from what direction the signal is incoming. There could be different possibilities to place the splitters/combiners 330a, 330b in the antenna arrangements 300a, 300b. FIG. 3 schematically illustrates different possible placings of the splitters/combiners 330a, 330b.

In some aspects splitters/combiners are close to the antenna elements 320a, 320b. Particularly, according to an embodiment each antenna element 320a, 320b has its own splitter/combiner 330a. The splitters/combiners 330a of the antenna elements 320a, 320b are provided between the antenna elements 320a, 320b and the analog distribution network 330. In this respect the splitters/combiners 330a might define an interface between the analog distribution network 330 and the antenna elements 320a, 320b.

In some aspects splitters/combiners are close to the baseband chains. Particularly, according to an embodiment, each baseband chain 310a, 310b has its own splitter/combiner 330b. The splitters/combiners 330b of the baseband chains 310a, 310b are provided between the baseband chains 310a, 310b and the analog distribution network 330.

There might thus be an extra layer of splitters/combiners 330a, 330b connected to each antenna element 320a, 320b and/or each baseband chain 310a, 310b. These splitters/combiners 330a, 330b might introduce some extra losses (around 3 dB) in signals S1, S2 transmitted and received by the radio transceiver device 200.

According to an embodiment the antenna arrangement 300a, 300b further comprises amplifiers 350a, 350b (amplifiers 350a, 350b are power amplifiers (PAs) and/or low noise amplifiers (LNAs)). For example, in case amplifiers 350a, 350b are provided, for example mounted in a distributed manner such that there is one amplifier per antenna element 320a, 320b as illustrated in FIG. 3, then the above-mentioned losses will have limited impact on the transmission/reception performance. Hence, according to an embodiment each antenna element 320a, 320b has its own amplifier 350a. Further, the amplifiers 350a might be provided between the splitters/combiners 330a and the antenna elements 320a, 320b.

During reception, before the received signals reaches the extra layer of splitters/combiners 330a, the amplifiers 350a have already increased the signal strength of received signals (including the wanted signal, interference and noise), which means that the power loss in the splitters/combiners 330a will only have small negative effect on the signal to interference plus noise ratio (SINR) of the received signals.

During transmission, the extra layer of combiners/splitters 330a are located before the amplifiers 350a, which means that almost no output power will be lost in these combiners/splitters 330a.

In further aspects there is provided one amplifier 350b per baseband chain 310a, 310b. That is, according to an embodiment each baseband chain 310a, 310b has its own amplifier 350b. Then, a respective one of these amplifiers 350b is operatively connected between each of the baseband chains 310a, 310b and the analog distribution network 330. Particularly, the respective one of these amplifiers 350b might be operatively connected between each of the baseband chains 310a, 310b and the splitters/combiners 330b, as in FIG. 3. The amplifiers 350b might combat any losses in power caused by the splitters/combiners 330b.

In some aspects the antenna arrangement 300a, 300b comprises phase shifters 340a, 340b. There could be different placements of the phase shifters 340a, 340b in the antenna arrangements 300a, 300b. In some aspect the phase shifters 340a, 340b are provided in the analog distribution network 330. Particularly, according to an embodiment each antenna element 320a, 320b has its own phase shifter 340a, 340b, and these phase shifters 340a, 340b are provided in the analog distribution network 330. According to the illustrative example in FIG. 3, the phase shifters 340a, 340b are provided between the splitters/combiners 330a and the splitters/combiners 330b.

The phase shifters 340a, 340b might be used to generate transmission and reception beams of different shapes at the antenna elements 320a, 320b for transmitting and receiving the signals S1, S2. Particularly, in some aspects the antenna arrangement 300a, 300b is configured for analog beamforming based on a first weight matrix having a first non-zero weight vector for the first polarization direction and a second weight matrix having a second non-zero weight vector for the second polarization direction. The second weight matrix is based on the weight vectors of the first weight matrix. Then, according to an embodiment the first weight matrix defines values of the phase shifters 340a of the first set of antenna elements 320a to generate a first beam for the first polarization direction, and the second weight matrix defines values of the phase shifters 340b of the second set of antenna elements 320b to generate a second beam for the second polarization direction. This enables dual-polarization beamforming with almost arbitrarily beam widths to be attained for any beam that has two orthogonal polarizations by means of phase shifts only.

There could be different types of placements of the antenna elements 320a, 320b in the antenna array 360. In some aspects the antenna elements 320a, 320b in the antenna array 360 fulfil some symmetry requirements. Particularly, according to an embodiment the antenna elements 320a, 320b are part of a uniform linear array (ULA), or a uniform rectangular array (URA). That is, in some aspects the antenna array 360 is an ULA or an URA. The antenna arrays 360 could thus be either a one-dimensional or a two-dimensional antenna array.

As the skilled person understands, although the illustrative examples of FIGS., 2 and 3 only illustrate antenna arrangements 300a, 300b having two baseband chains 310a, 310b and four antenna elements 320a, 320b (where each pair of antenna elements 320a, 320b could form a single dual polarized antenna elements 320c, see above) the embodiments disclosed herein are applicable for any number of antenna elements 320a, 320b for both one-dimensional and two-dimensional antenna arrays 360.

Reference is now made to FIG. 4 illustrating a method for operating an antenna arrangement 300a, 300b as disclosed above for transmission of a signal S1, S2 as performed by the radio transceiver device 200 according to an embodiment.

For transmission of a signal it is assumed that the signal is generated in, or provided to, the baseband chains 310a, 310b and from there provided to the antenna elements 320a, 320b. That is, the radio transceiver device 200 is configured to perform step S102:

S102: The radio transceiver device 200 provides the signal from the at least two baseband chains 310a, 310b to the first set of antenna elements 320a and to the second set of antenna elements 320b via the analog distribution network 330.

At the antenna elements 320a, 320b the signal is then transmitted. That is, the radio transceiver device 200 is configured to perform step S104:

S104: The radio transceiver device 200 simultaneously and wirelessly transmits the signal from all the antenna elements 320a, 320b.

As disclosed above, in some aspects the antenna arrangement 300a, 300b comprises splitters/combiners 330a, 330b, amplifiers 350a, 350b, and/or phase shifters 340a, 340b. The signal to be transmitted is then provided from the baseband chains 310a, 310b to the antenna elements 320a, 320b via these splitters/combiners 330a, 330b, amplifiers 350a, 350b, and/or phase shifters 340a, 340b.

Reference is now made to FIG. 5 illustrating a method for operating an antenna arrangement 300a, 300b as disclosed above for reception of a signal S1, S2 as performed by the radio transceiver device 200 according to an embodiment.

For reception of a signal it is assumed that the signal is received at at least one of the antenna elements 320a, 320b. That is, the radio transceiver device 200 is configured to perform step S202:

S202: The radio transceiver device 200 wirelessly receives the signal at the antenna elements 320a, 320b.

The signal is then provided to the baseband chains 310a, 310b from the antenna elements 320a, 320b. That is, the radio transceiver device 200 is configured to perform step S204:

S204: The radio transceiver device 200 provides the signal from all the antenna elements 320a, 320b which received the signal to all of the at least two baseband chains 310a, 310b via the analog distribution network 330.

As disclosed above, in some aspects the antenna arrangement 300a, 300b comprises splitters/combiners 330a, 330b, amplifiers 350a, 350b, and/or phase shifters 340a, 340b. The received is then provided to the baseband chains 310a, 310b from the antenna elements 320a, 320b via these splitters/combiners 330a, 330b, amplifiers 350a, 350b, and/or phase shifters 340a, 340b.

In some aspects there is disclosed a radio transceiver device 200 comprising an antenna arrangement 300a, 300b as herein disclosed. There could be different examples of radio transceiver devices 200 in which the herein disclosed antenna arrangements 300a, 300b could be provided. According to an embodiment the radio transceiver device 200 is a terminal device. The terminal device could, for example, be a portable wireless device, mobile station, mobile phone, handset, wireless local loop phone, user equipment (UE), smartphone, laptop computer, tablet computer, wireless modem, network equipped vehicle, network equipped sensor, or an Internet of Things (IoT) device. According to another embodiment the radio transceiver device 200 is a network node. The network node could, for example, be a TRP, a radio access network node, a radio base station, a base transceiver station, a node B, an evolved node B, a g node B, an access node, or an access point.

Figure 6:
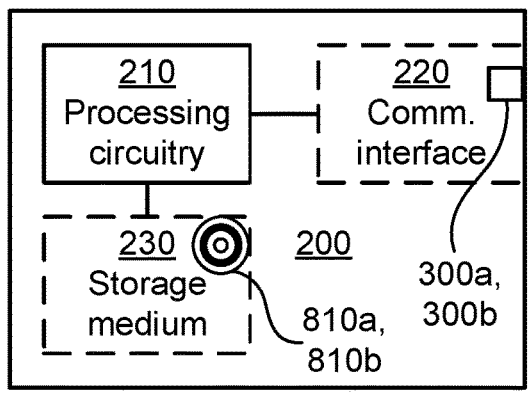
FIG. 6 is a schematic diagram showing functional units of a radio transceiver device according to an embodiment.

FIG. 6 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810a, 810b (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S104, S202-S204, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220. As such the communications interface 220 may comprise one or more transmitters and receivers, comprising analogue and digital components. The communications interface 220 could comprise an antenna arrangement 300a, 300b as herein disclosed The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 7:
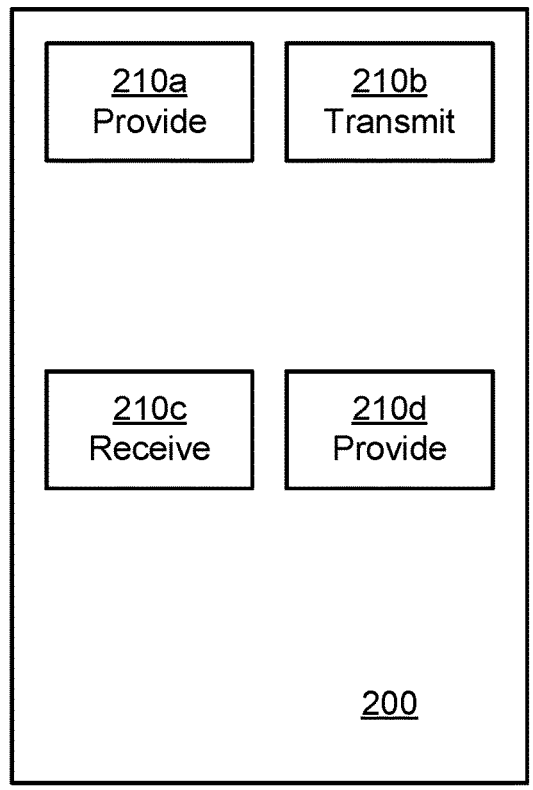
FIG. 7 is a schematic diagram showing functional modules of a radio transceiver device according to an embodiment.

FIG. 7 schematically illustrates, in terms of a number of functional modules, the components of a radio transceiver device 200 according to an embodiment. In some aspects the radio transceiver device 200 of FIG. 7 comprises a first provide module 210a configured to perform step S102, and a transmit module 210b configured to perform step S104. In some aspects the radio transceiver device 200 of FIG. 7 comprises a receive module 210c configured to perform step S202, and a second provide module 210d configured to perform step S204.

In general terms, each functional module 210a-210d may in one embodiment be implemented only in hardware and in another embodiment with the help of software, i.e., the latter embodiment having computer program instructions stored on the storage medium 230 which when run on the processing circuitry makes the radio transceiver device 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

A first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 6 the processing circuitry 210 may be distributed among a plurality of devices, or nodes. The same applies to the functional modules 210a-210d of FIG. 7 and the computer programs 820a, 820b of FIG. 8 (see below).

Figure 8:
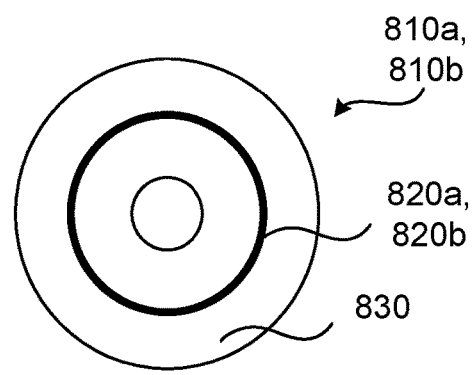
FIG. 8 shows one example of a computer program product comprising computer readable means according to an embodiment.

FIG. 8 shows one example of a computer program product 810a, 810b comprising computer readable storage medium 830. On this computer readable storage medium 830, a computer program 820a, 820b can be stored, which computer program 820a, 820b can cause the processing circuitry 210 and thereto operatively coupled entities and devices, such as the communications interface 220 and the storage medium 230, to execute methods according to embodiments described herein. The computer program 820a, 820b and/or computer program product 810a, 810b may thus provide means for performing any steps as herein disclosed.

In the example of FIG. 8, the computer program product 810a, 810b is illustrated as an optical disc, such as a CD (compact disc) or a DVD (digital versatile disc) or a Blu-Ray disc. The computer program product 810a, 810b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820a, 820b is here schematically shown as a track on the depicted optical disk, the computer program 820a, 820b can be stored in any way which is suitable for the computer program product 810a, 810b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An antenna arrangement, the antenna arrangement comprising:
   a first baseband chain;
   a second baseband chain;
   a first set of two or more antenna elements of a first polarization direction, the first set of two or more antenna elements comprising a first antenna element of the first polarization direction and a second antenna element of the first polarization direction;
   a second set of two or more antenna elements of a second polarization direction, the second set of two or more antenna elements comprising a first antenna element of the second polarization direction and a second antenna element of the second polarization direction; and
   an analog distribution network operatively connecting the first baseband chain and the second baseband chain to both sets of antenna elements, wherein
   the analog distribution network comprises: a first phase shifter; a second phase shifter; a third phase shifter, a fourth phase shifter, a fifth phase shifter; a sixth phase shifter; a seventh phase shifter, and an eighth phase shifter, and
   the first baseband chain is connected to the first antenna element of the first polarization direction via the first phase shifter,
   the first baseband chain is connected to the first antenna element of the second polarization direction via the second phase shifter,
   the first baseband chain is connected to the second antenna element of the first polarization direction via the third phase shifter,
   the first baseband chain is connected to the second antenna element of the second polarization direction via the fourth phase shifter,
   the second baseband chain is connected to the first antenna element of the first polarization direction via the fifth phase shifter,
   the second baseband chain is connected to the first antenna element of the second polarization direction via the sixth phase shifter,
   the second baseband chain is connected to the second antenna element of the first polarization direction via the seventh phase shifter, and
   the second baseband chain is connected to the second antenna element of the second polarization direction via the eighth phase shifter.

2. The antenna arrangement of claim 1, wherein
   the first antenna element of the first polarization direction and the first antenna element of the second polarization direction form a first dual polarized antenna element, and the second antenna element of the first polarization direction and the second antenna element of the second polarization direction form a second dual polarized antenna element.

3. The antenna arrangement of claim 1, wherein the antenna arrangement comprises not more than two baseband chains.

4. The antenna arrangement of claim 1,
wherein
the analog distribution network further comprises a first splitter/combiner and a second splitter/combiner,
the first baseband chain is connected to the first antenna element of the first polarization direction via the first phase shifter and the first splitter/combiner, and
the first baseband chain is connected to the first antenna element of the second polarization direction via the second phase shifter and the second splitter/combiner.

5. The antenna arrangement of claim 4, wherein
the second baseband chain is connected to the first antenna element of the first polarization direction via the fifth phase shifter and the first splitter/combiner, and
the second baseband chain is connected to the first antenna element of the second polarization direction via the sixth phase shifter and the second splitter/combiner.

6. The antenna arrangement of claim 5, wherein
the analog distribution network further comprises a third splitter/combiner and a fourth splitter/combiner,
the first baseband chain is connected to the second antenna element of the first polarization direction via the third phase shifter and the third splitter/combiner,
the first baseband chain is connected to the second antenna element of the second polarization direction via the fourth phase shifter and the fourth splitter/combiner,
the second baseband chain is connected to the second antenna element of the first polarization direction via the seventh phase shifter and the third splitter/combiner, and
the second baseband chain is connected to the second antenna element of the second polarization direction via the eighth phase shifter and the fourth splitter/combiner.

7. The antenna arrangement of claim 6,
wherein
the analog distribution network further comprises a fifth splitter/combiner and a sixth splitter/combiner,
the first baseband chain is connected to the first antenna element of the first polarization direction via the first phase shifter, the first splitter/combiner, and the fifth splitter/combiner,
the first baseband chain is connected to the first antenna element of the second polarization direction via the second phase shifter, the second splitter/combiner, and the fifth splitter/combiner,
the first baseband chain is connected to the second antenna element of the first polarization direction via the third phase shifter, the third splitter/combiner, and the fifth splitter/combiner,
the first baseband chain is connected to the second antenna element of the second polarization direction via the fourth phase shifter, the fourth splitter/combiner, and the fifth splitter/combiner,
the second baseband chain is connected to the first antenna element of the first polarization direction via the fifth phase shifter, the first splitter/combiner, and the sixth splitter/combiner,
the second baseband chain is connected to the first antenna element of the second polarization direction via the sixth phase shifter, the second splitter/combiner, and the sixth splitter/combiner,
the second baseband chain is connected to the second antenna element of the first polarization direction via the seventh phase shifter, the third splitter/combiner, and the sixth splitter/combiner, and
the second baseband chain is connected to the second antenna element of the second polarization direction via the eighth phase shifter, the fourth splitter/combiner, and the sixth splitter/combiner.

8. The antenna arrangement of claim 1, wherein
the analog distribution network further comprises a first splitter/combiner and a second splitter/combiner,
the first baseband chain is connected to the first antenna element of the first polarization direction via the first phase shifter and the first splitter/combiner,
the first baseband chain is connected to the first antenna element of the second polarization direction via the second phase shifter and the first splitter/combiner,
the first baseband chain is connected to the second antenna element of the first polarization direction via the third phase shifter and the first splitter/combiner,
the first baseband chain is connected to the second antenna element of the second polarization direction via the fourth phase shifter and the first splitter/combiner,
the second baseband chain is connected to the first antenna element of the first polarization direction via the first phase shifter and the second splitter/combiner,
the second baseband chain is connected to the first antenna element of the second polarization direction via the second phase shifter and the second splitter/combiner,
the second baseband chain is connected to the second antenna element of the first polarization direction via the seventh phase shifter and the second splitter/combiner, and
the second baseband chain is connected to the second antenna element of the second polarization direction via the eighth phase shifter and the second splitter/combiner.

9. The antenna arrangement of claim 1, wherein the antenna arrangement is configured for analog beamforming based on a first weight matrix having a first non-zero weight vector for the first polarization direction and a second weight matrix having a second non-zero weight vector for the second polarization direction, wherein
the second weight matrix is based on the weight vectors of the first weight matrix,
the first weight matrix defines values of the first, third, fifth and seventh phase shifters to generate a first beam for the first polarization direction, and
the second weight matrix defines values of the second, fourth, sixth and eighth phase shifters to generate a second beam for the second polarization direction.

10. The antenna arrangement of claim 1, further comprising:
power amplifiers and/or low noise amplifiers.

11. The antenna arrangement of claim 1, further comprising:
   a first amplifier connected to the first antenna element of the first polarization direction,
   a second amplifier connected to the first antenna element of the second polarization direction,
   a third amplifier connected to the second antenna element of the first polarization direction, and
   a fourth amplifier connected to the second antenna element of the second polarization direction.

12. The antenna arrangement of claim 1, further comprising:
   a first low noise amplifier connected between the first baseband chain and the analog distribution network; and
   a second low noise amplifier connected between the second baseband chain and the analog distribution network.

13. The antenna arrangement of claim 1, further comprising:
   a first power amplifier connected between the first baseband chain and the analog distribution network; and
   a second power amplifier connected between the second baseband chain and the analog distribution network.

14. The antenna arrangement of claim 1, wherein the antenna elements are part of a uniform linear array or a uniform rectangular array.

15. A radio transceiver device comprising the antenna arrangement of claim 1.

16. The radio transceiver device of claim 15, wherein the radio transceiver device is a terminal device or a transmission and reception point.

17. A radio transceiver device for operating the antenna arrangement of claim 1 for transmission of a signal, the radio transceiver device comprising processing circuitry, the processing circuitry being configured to cause the radio transceiver device to:
   provide the signal from the first and second baseband chains to the first set of antenna elements and to the second set of antenna elements via the analog distribution network; and
   simultaneously and wirelessly transmit the signal using the first set of antenna elements and the second set of antenna elements.

18. A radio transceiver device for operating the antenna arrangement of claim 1 for reception of a signal, the radio transceiver device comprising processing circuitry, the processing circuitry being configured to cause the radio transceiver device to:
   wirelessly receive the signal using the first set of antenna elements and the second set of antenna elements; and
   provide the signal to the first and second baseband chains via the analog distribution network.

19. A computer program product comprising a non-transitory computer readable medium storing a computer program for operating the antenna arrangement of claim 1 for transmission of a signal, the computer program comprising computer code which, when run on processing circuitry of a radio transceiver device, causes the radio transceiver device to:
   provide the signal from the first and second baseband chains to the first set of antenna elements and to the second set of antenna elements via the analog distribution network; and
   simultaneously and wirelessly transmit the signal using the first set of antenna elements and the second set of antenna elements.

20. A computer program product comprising a non-transitory computer readable medium storing a computer program for operating the antenna arrangement of claim 1 for reception of a signal, the computer program comprising computer code which, when run on processing circuitry of a radio transceiver device, causes the radio transceiver device to:
   wirelessly receive the signal using the first antenna element of the first polarization direction, the second antenna element of the first polarization direction, the first antenna element of the second polarization direction, and the second antenna element of the first polarization direction; and
   provide the signal to the first and second baseband chains via the analog distribution network.

21. A method for operating an antenna arrangement for transmission of a signal, the method being performed by a radio transceiver device, wherein the antenna arrangement comprises: a first baseband chain; a second baseband chain; a first set of two or more antenna elements of a first polarization direction, the first set of two or more antenna elements comprising a first antenna element of the first polarization direction and a second antenna element of the first polarization direction; a second set of two or more antenna elements of a second polarization direction, the second set of two or more antenna elements comprising a first antenna element of the second polarization direction and a second antenna element of the second polarization direction; and an analog distribution network operatively connecting the first baseband chain and the second baseband chain to both sets of antenna elements, wherein the analog distribution network comprises: a first phase shifter; a second phase shifter; a third phase shifter, a fourth phase shifter, a fifth phase shifter; a sixth phase shifter; a seventh phase shifter, and an eighth phase shifter, and the first baseband chain is connected to the first antenna element of the first polarization via the first phase shifter, the first baseband chain is connected to the first antenna element of the second polarization via the second phase shifter, the first baseband chain is connected to the second antenna element of the first polarization via the third phase shifter, the first baseband chain is connected to the second antenna element of the second polarization via the fourth phase shifter, the second baseband chain is connected to the first antenna element of the first polarization via the fifth phase shifter, the second baseband chain is connected to the first antenna element of the second polarization via the sixth phase shifter, the second baseband chain is connected to the second antenna element of the first polarization via the seventh phase shifter, and the second baseband chain is connected to the second antenna element of the second polarization via the eighth phase shifter, the method comprising:
   providing the signal from the first and second baseband chains to the first set of antenna elements and to the second set of antenna elements via the analog distribution network; and
   simultaneously and wirelessly transmitting the signal from all the antenna elements.

22. A method for reception of a signal, the method being performed by a radio transceiver device, the method comprising:
   wirelessly receiving the signal at an antenna arrangement, wherein the antenna arrangement comprises: a first baseband chain; a second baseband chain; a first set of two or more antenna elements of a first polarization direction, the first set of two or more antenna elements comprising a first antenna element of the first polarization direction and a second antenna element of the first polarization direction; a second set of two or more antenna elements of a second polarization direction, the second set of two or more antenna elements comprising a first antenna element of the second polarization direction and a second antenna element of the second polarization direction; and an analog distribution network operatively connecting the first baseband chain and the second baseband chain to both sets of antenna elements, wherein the analog distribution network comprises: a first phase shifter; a second phase shifter; a third phase shifter, a fourth phase shifter, a fifth phase shifter; a sixth phase shifter; a seventh phase shifter, and an eighth phase shifter, and the first baseband chain is connected to the first antenna element of the first polarization via the first phase shifter, the first baseband chain is connected to the first antenna element of the second polarization via the second phase shifter, the first baseband chain is connected to the second antenna element of the first polarization via the third phase shifter, the first baseband chain is connected to the second antenna element of the second polarization via the fourth phase shifter, the second baseband chain is connected to the first antenna element of the first polarization via the fifth phase shifter, the second baseband chain is connected to the first antenna element of the second polarization via the sixth phase shifter, the second baseband chain is connected to the second antenna element of the first polarization via the seventh phase shifter, and the second baseband chain is connected to the second antenna element of the second polarization via the eighth phase shifter; and providing the signal from all the antenna elements which received the signal to the first and second baseband chains via the analog distribution network.

* * * * *

UNITED STATES PATENT AND TRADEMARK OFFICE
CERTIFICATE OF CORRECTION

PATENT NO. : 10,320,450 B2
APPLICATION NO. : 15/561091
DATED : June 11, 2019
INVENTOR(S) : Petersson et al.

Page 1 of 1

It is certified that error appears in the above-identified patent and that said Letters Patent is hereby corrected as shown below:

In the Specification

Column 5, Line 36, delete "in in" and insert -- in --, therefor.

Column 7, Line 15, delete "FIGS., 2 and 3" and insert -- FIGS. 2 and 3 --, therefor.

Column 8, Line 60, delete "disclosed" and insert -- disclosed. --, therefor.

In the Claims

Column 11, Line 9, in Claim 4, delete "wherein" and insert the same at Line 8 after "claim 1," as a continuation point.

Column 11, Line 48, in Claim 7, delete "wherein" and insert the same at Line 47 after "claim 6," as a continuation point.

Signed and Sealed this
Ninth Day of June, 2020

Andrei Iancu
*Director of the United States Patent and Trademark Office*